United States Patent [19]
Groya et al.

[11] Patent Number: 5,193,722
[45] Date of Patent: * Mar. 16, 1993

[54] SIDE DISPENSING CLOSURE

[75] Inventors: Robert J. Groya, Norridge; Richard W. Hofmann, Chicago, both of Ill.

[73] Assignee: Magenta Corporation, Chicago, Ill.

[*] Notice: The portion of the term of this patent subsequent to Jan. 15, 2008 has been disclaimed.

[21] Appl. No.: 737,214

[22] Filed: Jul. 29, 1991

Related U.S. Application Data

[63] Continuation of Ser. No. 393,675, Aug. 14, 1989, Pat. No. 5,054,663, which is a continuation-in-part of Ser. No. 234,568, Aug. 22, 1988, abandoned, which is a continuation-in-part of Ser. No. 317,463, Mar. 1, 1989, Pat. No. 4,984,720.

[51] Int. Cl.$^5$ .............................................. B67D 5/06
[52] U.S. Cl. ..................................... 221/531; 279/153; 279/486; 279/536; 279/556
[58] Field of Search ............................ 222/484–486, 222/498, 531, 536, 544, 556, 564, 565; 215/235, 297; 220/254, 339

[56] References Cited

U.S. PATENT DOCUMENTS

| | | |
|---|---|---|
| 1,224,583 | 5/1917 | Vaughan ........................ 222/531 |
| 1,268,901 | 6/1918 | Weil ............................... 222/531 |
| 2,327,420 | 8/1943 | Grosse ............................ 222/531 |
| 3,024,950 | 3/1962 | Frison ............................ 222/531 |
| 3,048,309 | 8/1962 | Albiani .......................... 222/531 |
| 3,144,180 | 8/1964 | Phillipps et al. .............. 222/531 |
| 3,302,835 | 2/1967 | Eckles ............................ 222/498 |
| 3,322,308 | 5/1967 | Foster ............................ 222/498 |
| 3,498,507 | 3/1970 | Seaver ............................ 222/486 |
| 3,499,588 | 3/1970 | Bartilson et al. .............. 222/565 |
| 3,718,238 | 2/1973 | Hazard et al. ................. 222/536 |
| 4,984,720 | 1/1991 | Groya et al. .................. 222/536 |
| 5,054,663 | 10/1991 | Groya et al. ................. 222/536 |

Primary Examiner—Robert P. Olszewski
Assistant Examiner—Steven M. Reiss
Attorney, Agent, or Firm—Laff, Whitesel, Conte & Saret

[57] ABSTRACT

A side dispensing container closure cap is provided with a hinged lid extending to a side periphery of the cap and which is pivotable from a closed position to an opened position and which has depending side walls along the length of the pivotable portion forming a chute passage to the periphery of the cap, the chute passage has dividing walls between the side walls to define a plurality of chute-like passages. Stops are provided to allow partial opening of the pivoted portion and a reinforcing web interconnects the lower portion of the side walls and dividing walls.

4 Claims, 4 Drawing Sheets

SIDE DISPENSING CLOSURE

BACKGROUND OF THE INVENTION

This application is a continuation of our application No. 07/393,675 filed Aug. 14, 1989, now U.S. Pat. No. 5,054,663 of Oct. 8, 1991; which is a continuation-in-part of Ser. No. 234,568, filed Aug. 22, 1988, now abandoned; and a continuation-in-part of Ser. No. 317,463, filed Mar. 1, 1989, now U.S. Pat. No. 4,984,720 of Jan. 15, 1991.

FIELD OF THE INVENTION

This invention relates to container closures and more particularly to a side dispensing pivoted top container closure.

PRIOR ART

Containers are normally fitted with closure caps which are frequently molded plastic cap members. Numerous examples exist of such molded closures equipped with dispensing tops including devices where a portion of the end piece or top of the dispensing cap is pivotable from a closed position to an open dispensing position. Such dispensing tops normally provide for contents dispensing in a direction substantially normal to the plane of the end face of the cap. Frequently, however, containers are provided with side dispensing openings, particularly where the container is provided for dry, shakeable ingredients such as, for example, grass seed, rock salt or the like. Often such side dispensing openings are formed as tear away portions of the container and such tear away portions may include both a portion of a side wall of the container and a portion of a top wall of the container.

More recently, plastics material containers have been used for packaging such products and it is frequently not desirable to provide tear away portions for such containers. Such containers, once opened, may not thereafter adequately protect the remaining contents from environmental conditions, such as moisture. Equipping such containers with shakeable dispenser caps having top openings generally requires the container be held in an inverted position. This is frequently awkward and can result in undesired dispensing patterns and difficulty in achieving proper flow control.

Chute type pivoted side dispensers are also known to the art, such as the classic table salt container utilizing a small pivotable (generally metal) chute forming member attached to the top of the container which can be pivoted to define a pouring chute providing a opening between the top of the pivoted member and side walls which depend from the top and extend into the interior of the container. Such chute-like dispensers have generally not been adapted for shaking type dispensing, nor do they have a reinforcing web interconnecting the bottom of the side walls, nor do they have multiple chute orifices, nor do they have means to provide multiple sized openings, nor have they generally been designed to extend directly to the periphery of the cap.

It would therefore be an improvement in the art to provide a container closure cap that has a hinged top and chute-like side dispenser means to provide a side pour dispenser which is particularly applicable for shake dispensing.

It would be a further improvement in the art to provide a molded plastic side pour container cap which cap is capable of side dispensing via a hinged chute-like top lid portion which opens adjacent the periphery of the cap and has a reinforcing web.

SUMMARY OF THE INVENTION

The present invention provides a container closure cap which is preferably a one-piece molded plastic cap. The cap includes a skirt portion which may be provided with female threads for attachment to the male threaded neck of a container and a top surface. The top surface lid is connected to the skirt to preferably form a hat-like closure cap. The top has a hinged lid portion which may be formed with a living hinge and which extends to adjacent the periphery of the top surface. The hinged lid portion has a top lid wall with depending side walls which, together with the hinged top lid wall, define a chute-like dispensing opening adjacent to periphery of the top surface. Internal divider walls are preferably provided to define a plurality of chute-like dispensers. A reinforcing web member joins the lower portion of the side walls and divider walls to define plurality of dispensing orifices. The divider walls are substantially parallel to each other. Stop members may be provided for locking the lid in several open and closed positions. A lip on the lid overlies the periphery of the hat-like extension to allow the hinged lid to be readily opened. The bottom web preferably has stop means thereon to prevent the lid from opening beyond the bottom of the web.

In this manner we provide a one piece molded plastic container closure adapted for side dispensing which has at least one and preferably a plurality of chute-like dispensing orifices which open substantially at the periphery of the closure so as to facilitate side dispensing of the ingredients contained within the container. If desired, one or more of the side walls or divider walls may be provided with beads or ribs which can cooperate with portions of the container periphery or with an inturned lip thereat, to retain the dispensing opening in various open or closed positions.

It is therefore a principal object of this invention to provide an improved side dispensing container closure or cap.

It is a specific object of this invention to provide an improved one-piece molded plastic container closure or cap adapted for side dispensing of the container's contents through a dispensing opening formed adjacent a peripheral edge of the closure and by a plurality of chute-like dispensers formed as part of a hinged lid which is hinged to the closure top by a living hinge. The hinged lid has side walls, at least one internal divider wall between the side walls and a web interconnecting the bottom portions of the side walls and divider walls to define a plurality of dispensing orifices and having projections which interfit with other portions of the top to retain the hinged portions selectively opened or closed.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

DESCRIPTION OF PREFERRED EMBODIMENTS

Figure 1:
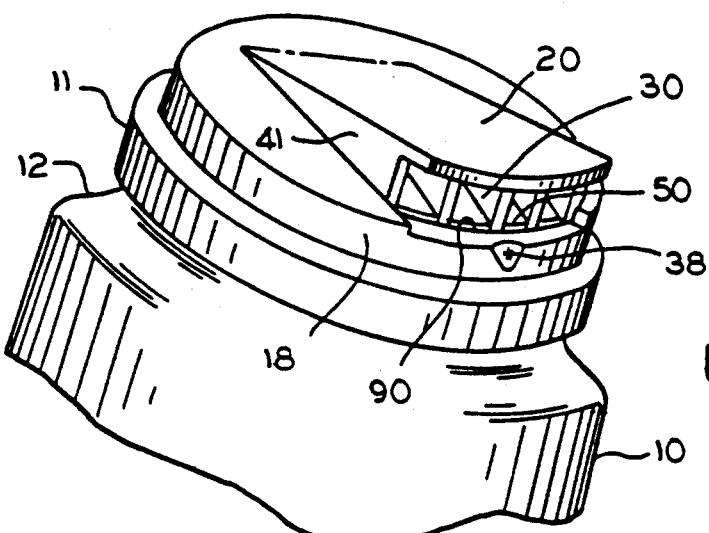
FIG. 1 is a fragmentary prospective view of a container equipped with closure cap of this invention with the dispensing orifice open.

FIG. 1 illustrates a container 10 equipped with a onepiece molded plastic or closure cap 11. The particular shape of the container has no importance to this invention except that it is equipped with a open ended throat 12 which may have a means for affixing a closure to the container formed thereon. In the further discussion of the preferred embodiment the fixing means on the closure is shown as including female threads 13 which would index with male threads on the neck of the container. Alternatively other types of cooperating fasteners may be used such as a snap-on bead fasteners or the like.

The type of container sought to be illustrated is a dry goods container generally molded of plastic which has recently become popular for ingredients designed to be shaken such as grass seed, road salt, fertilizer and the like. Such containers are generally large and they may hold a quart or more of product to be dispensed.

The particular closure of this invention is particularly well adapted for use with dry ingredient and dispensing and particularly of that type of dry ingredient which is most advantageously dispensed by a back and forth sweeping or shaking motion of the container.

However, the container and closure may be sized for finer materials such as spices, powders, and even liquids such as syrups, oils and shampoos.

The closure body is illustrated as hat-like with a depending peripheral skirt 15 on which the internal female threads 13 are formed. The top 16 is formed as a generally hat-like extension extending upwardly from the skirt but positioned inwardly therefrom and spaced from the periphery of the skirt by a ledge section 17. The ledge 17 may overlie the rim of the container. The hat-like extension includes an annular peripheral wall portion 18 and a top end wall 19 Such hat-like closures are common in the industry. The closure, including the skirt 15, the ledge 17, the periphery wall 18 and the top end wall 19 is circular although if desired other shapes could be employed as will be apparent to those skilled in the art. An annular skirt is preferred because the closure is generally adapted for containers have a circular neck.

The top end wall 19 is provided with a hinged lid portion 20 which occupies more than half of the top wall 19. The lid is pivotally connected to the top end wall through a living hinge connection 21. As illustrated, the hinged lid portion fits in a dispensing aperture or an opening 90 in the top 19. The lid extends from the hinge to the periphery 27 and is defined by converging sidewalls 25 and 26 which generally converge from the hinge to the periphery. The width of the hinge and the width of the opening at the periphery are predetermined depending on what material is to be dispensed and on what container the closure is to be used. The hinged lid 20 is provided in the manner of a flap or leaf which is attached to the top wall only at the living hinge.

Figure 4:
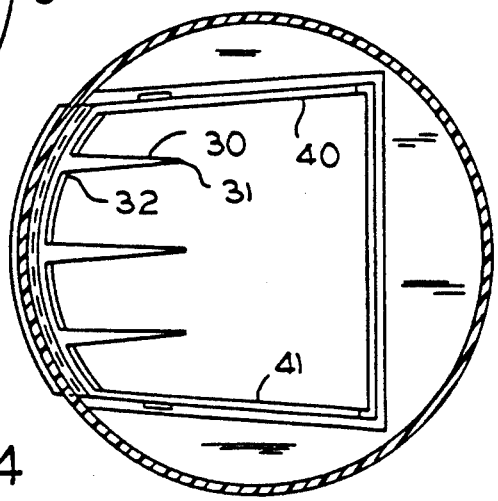
FIG. 4 is a cross-sectional view taken along the lines of 4—4 of FIG. 3.
Figure 5:
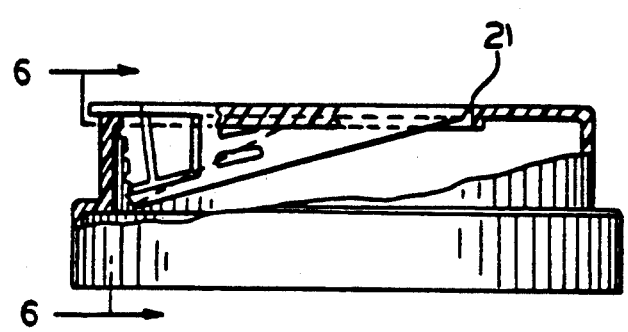
FIG. 5 is a side view with portions broken away to show underlying portions of a container closure cap of FIG. 1.

The undersurface 29 of the hinged lid portion is provided with a plurality of divider walls 30 which, in the preferred embodiment are parallel to each other but at a slight angle to the converging sidewalls. The divider walls (30) may be of uniform thickness or of varying thickness. As illustrated in FIG. 4, each dividing wall 30 has a narrow tail end 31 and a wider forward end 32 adjacent the forward end of the hinged lid 20. The dividing walls 30 terminate short of the foremost projection or periphery 27 of the hinged lid 20 which foremost projection overlies and extends beyond the peripheral top 36 of the wall 18 to form an opening lip 35. A portion of the wall 18 underlying the lip may be recessed as at 38 to facilitate insertion of the portion of the finger to pry open the hinged lid 20.

Sidewalls 40 and 41 extend downwardly from the top surface 42 of the hinged lid at the sides 25 and 26. Both the sidewalls 40 and 41 and the dividing walls 30 are wedge-shaped such that they project below the undersurface 29 to a greater extent adjacent the dispensing peripheral opening 27 and decrease in height towards the living hinge portion. The sidewalls 40 and 41 may extend all the way back to the living hinge and are sized to provide side walls when the lid is in all of its open operating positions. The side walls generally slidably contact the sides of the dispensing aperture 90 so as to provide the desired chute-like dispenser. The dividing walls 30 may be terminated intermediate the fronts 32 of the ribs and the living hinge and may therefore have a greater angle of wedge inclination than the sidewalls.

Figure 6:
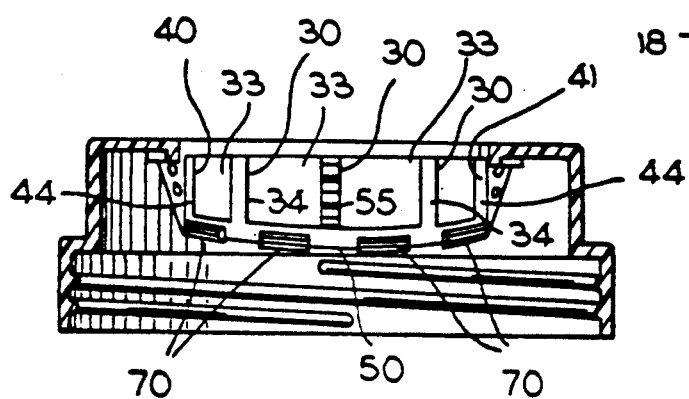
FIG. 6 is a sectional view taken from the front of the container closure adjacent the dispensing openings substantially along the lines of 6—6 of FIG. 5.

As best illustrated in FIG. 6 the walls 30 and sidewalls 40 and 41 are all interconnected at the dispensing end of the hinged flap section 20 at their bottoms by a reinforcing web member 50.

Figure 7:
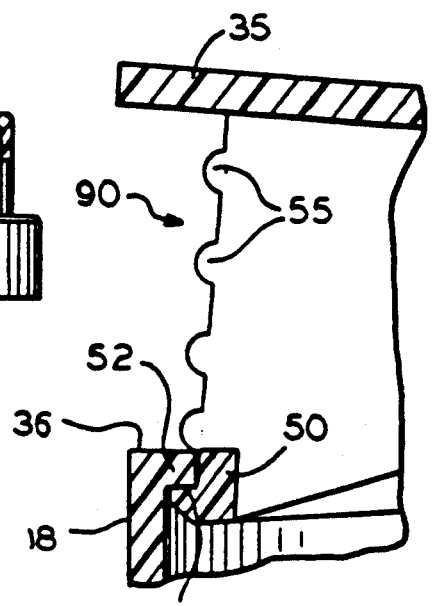
FIG. 7 is a enlarged fragmentary sectional view taken substantially along the lines of 7—7 of FIG. 2.

As illustrated in FIG. 7, the web member 50 has a projecting latch portion 51. This is designed to underlie in an inturned lip portion 52. The lip 52 is at the top 36 of the periphery wall 18 and is sized to form a catch that with the latches 51 limits the opening of the lid.

Figure 8:
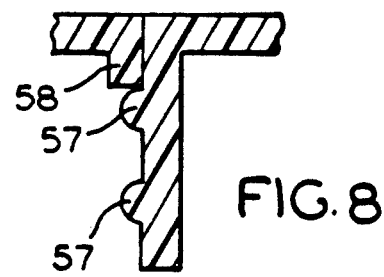
FIG. 8 is a enlarged fragmentary sectional view substantially along the lines of 8—8 of FIG. 2 with the dispensing orifice closed.

Additionally, one or more of the dividing walls 30 may be provided with latch beads 55 which are dimensioned to underlie and overlie respectively the inturned lip 52 as the lid 20 is moved towards a wider or narrower opening. The beads 55 cooperate with optimally projecting bead ribs 57 formed on the sidewalls 40 and 41. The bead ribs 57, as shown in FIG. 8, cooperate with a downturned lip 58 formed on the undersurface 59 of the top 19 at the sides 25 and 26 of the dispensing opening 90 formed for receipt of the hinged lid 20. In this manner a plurality of opened positions can be provided allowing the hinged lid to be snapped into greater and lesser opened positions. In the most fully closed position both the topmost of the beads 55 and the topmost of the bead ribs 57 cooperate with their respective opposed surfaces of the lips 52 and 58 to maintain the dispensing flap closed.

Figure 9:
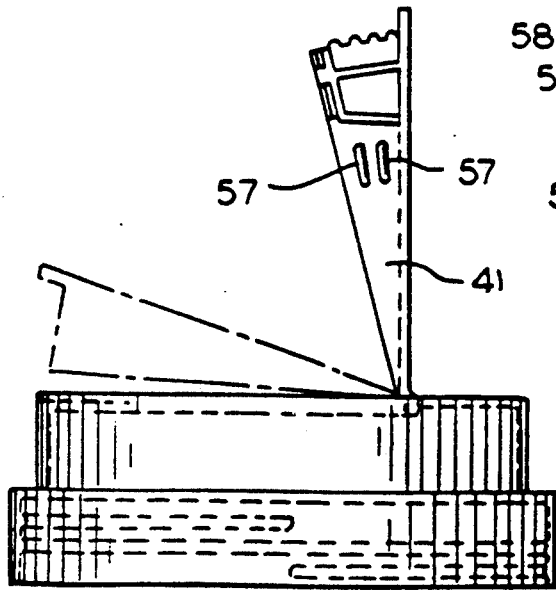
FIG. 9 is a side plan view of the container closure of FIG. 1 illustrating the position in which the closure may be molded and, by dotted lines showing closure of the chute dispensing mechanism.

As illustrated in FIG. 9 the closure of this invention may be formed in a single molding most expeditiously by molding the hinge portion elevated out of the opening in the top 19 into which it is to fit. Thereafter by forcing the web latch 51 which may be formed with a series of spaced stop ribs 70 best shown in FIG. 6, past the inturn lip 52, the pivoted flap section 20 can then be inserted into operable position in the remainder of the closure cap. It will be appreciated that this forcing can occur because the cap will be formed of a rigid but partially yieldable plastics material.

It will be seen that by forming the inturned lip 52 of relatively small dimensions extending directly inwardly from the periphery of wall 18 that the actual dispensing opening 90 will lie substantially at the periphery of the hat-like top. Again, by maintaining the ledge 17 relatively small, or even nonexistent, the actual dispensing will occur at the periphery. Moreover it will be appreciated that the hinged lid 20 when in an open position defines a chute-like dispenser defined by the undersurface 29, the sidewalls 40 and 41 and/or internal chute divider walls 30 and web 50. This provides a plurality of chute-like dispensing passages 33 (FIG. 6). This chute-like dispensing, particularly when coupled with the variable opening settings provided by the ribs 55 and/or rib beads 57 allows very effective dispensing especially of dry or granular material from the container.

However, when the flap is closed, it is held in a secure closed position by the beads 55 and bead ribs 5 to insure against accidental spillage and to act as a protective closure for the contents. It will be appreciated that by rounding or inclining the surfaces of the beads 55 adjacent to their latch slots as illustrated, and by rounding the top and bottom surfaces of the bead ribs 57, that an over center snapping action can be provided for during closing to maintain the actual pivoted flap in a secure closed position with the container being tightly closed at the dispensing opening with the projecting lip 35 pressed against the top surface 36.

By properly sizing the position of the sidewalls 40 and 41, little or no gap will exist between the downturn lip 58 and the sidewalls.

Figure 3:
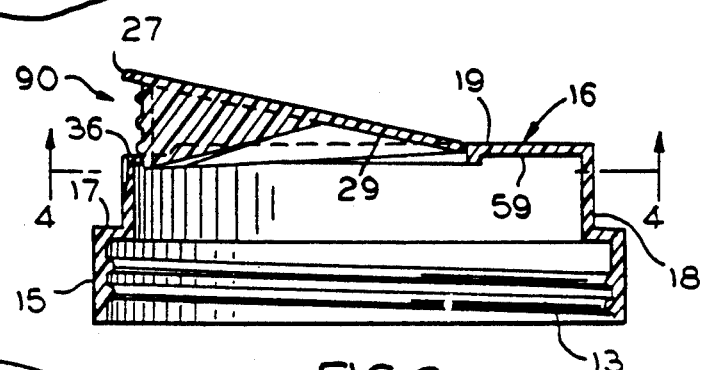
FIG. 3 is a cross-sectional view taken along the lines 3—3 of FIG. 2.
Figure 2:
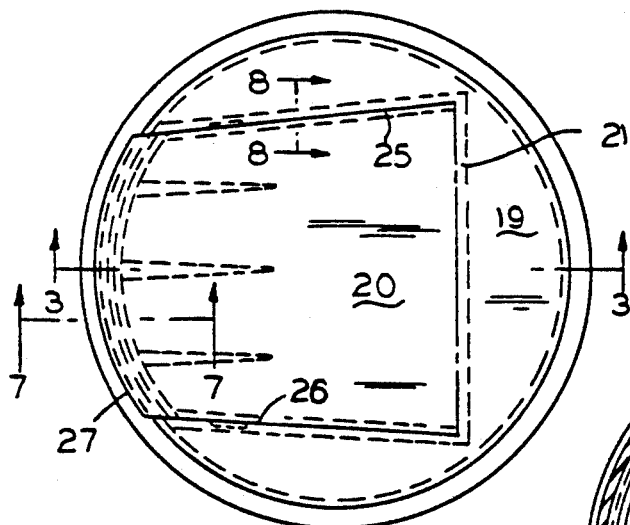
FIG. 2 is a top plan view of the closure cap of FIG. 1.

In addition a seal-like connection can be provided at the top of the bead ribs to the sidewall. If desired the bead ribs can be extended to enhance that seal. Alternatively, if desired, the lid can extend slightly beyond the sidewalls and a corresponding portion of the top 19 adjacent the sides 25 and 26 can be recessed to facilitate the seal. It will be appreciated that the skirt portion 18 is recessed at the top at the portion overlied by the lip 35 as illustrated at 36 in FIG. 3. A similar recessing can extend along the sidewalls if desired.

To reiterate, one of the embodiments of our invention has a side dispensing closure 11 for a container 10. The closure body has a top end wall 19, bounded by a skirt 15. The skirt has internal means 13 to attach the closure to the container. A relatively large aperture 90 is formed in the end wall to permit the dispensing of pourable product carried in the container. A hinged lid 20 is integrally attached to the top wall 19 to open and close the aperture 90. The lid 20 has a rear 21, front 27 and two sides 25, 26 with its rear being hinged to the top wall and said front 27 extending beyond the periphery of the top wall to form a lip 35. A pair of side walls 40, 41 depending from the sides of the lid and are adapted to move in the aperture 90 when said lid is pivoted from an open position to a closed position. The lid has at least one separate dividing wall 30 depending from the undersurface of the lid, spaced a predetermined distance from each of the side walls and a reinforcing web 50 interconnecting the bottom front portions of the side walls and dividing wall. The dividing wall, side walls, lid and web forming at least two chute-like dispensing orifices 33. When more than one dividing wall is used, they preferably extend parallel to each other. The side walls and dividing walls have front ends 44 and 34 respectively which extend the entire width or opening of the orifices 33. Preferably at least one side wall has a latch mechanism 55 to hold the lid in a desired position.

Figure 10:
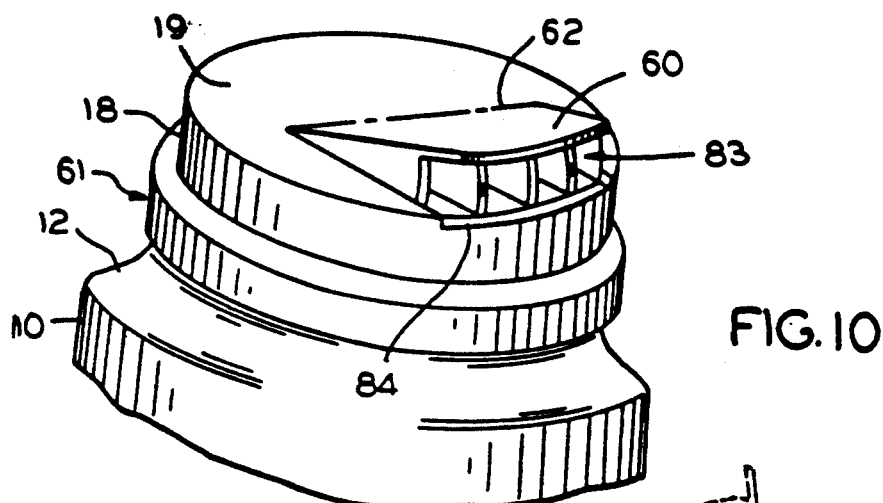
FIG. 10 is a fragmentary prospective view of a container equipped with another closure cap of this invention with the dispensing orifice open.

In a preferred embodiment, as illustrated generally in FIG. 10 the container 10 is equipped with a closure 61. The closure cap 61 has female threads 13 on the closure skirt 15 which would index with male threads on the neck of the container. Alternatively as noted above other types of fasteners may be used such as a snap-on bead fastener or the like.

Figure 12:
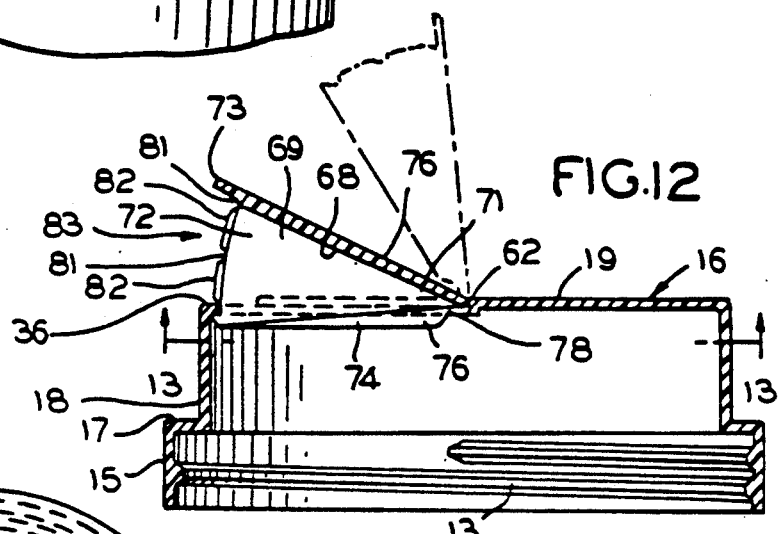
FIG. 12 is a cross-sectional view taken along the lines of 12—12 of FIG. 11.
Figure 11:
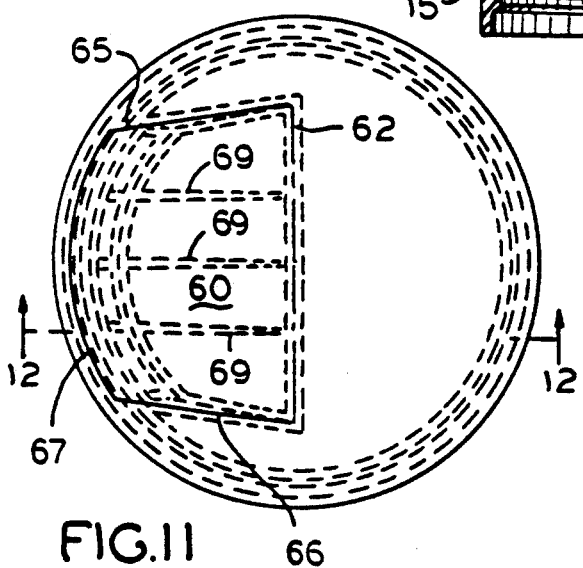
FIG. 11 is a top plan view of the closure cap of FIG. 10.
Figure 13:
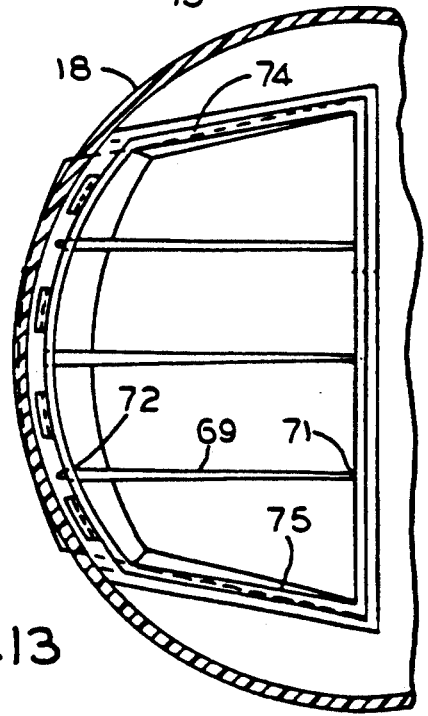
FIG. 13 is a cross-sectional view taken along the lines of 13—13 of FIG. 12.

The closure as illustrated in FIGS. 10-12 has a depending peripheral skirt 15 on which the internal female threads 13 are formed. The top 16 is formed as a generally hat-like extension extending upwardly from the skirt but positioned inwardly therefrom and spaced from the periphery of the skirt by a ledge section 17 The ledge section may overlie the rim of the container. The hat-like extension includes a peripheral wall portion 18 and a top portion 19. The closure, including the skirt 15, the ledge 17, the periphery 18 and the top 19 is circular although if desired other shapes, except for the skirt 15, could be employed as will be apparent to those skilled in the art.

The top 19 is provided with a hinged lid portion 60 which occupies less than half of the top wall 19. The lid is connected to the remaining portions of the top wall through a living hinge connection 62 which extends chordally of the top and is positioned such that the hinged portion occupies a substantial portion of the area of the top. When the periphery 18 is circular, as in the preferred embodiment illustrated, the hinge connection in this embodiment is located at the diameter of the top 19 so that all generated curves, as will be described in greater detail below, can be generated with the hinges connection as the centerpoint. As illustrated, the hinged portion fits in an opening 84 in the top 19. The lid extends from the hinge to the periphery and is defined by converging sidewalls 65 and 66. The side walls at dispensing periphery 67 are spaced apart a considerable distance. The hinged portion 60 is provided in the manner of a flap or leaf which is attached to the top wall only at the living hinge 62.

Figure 14:
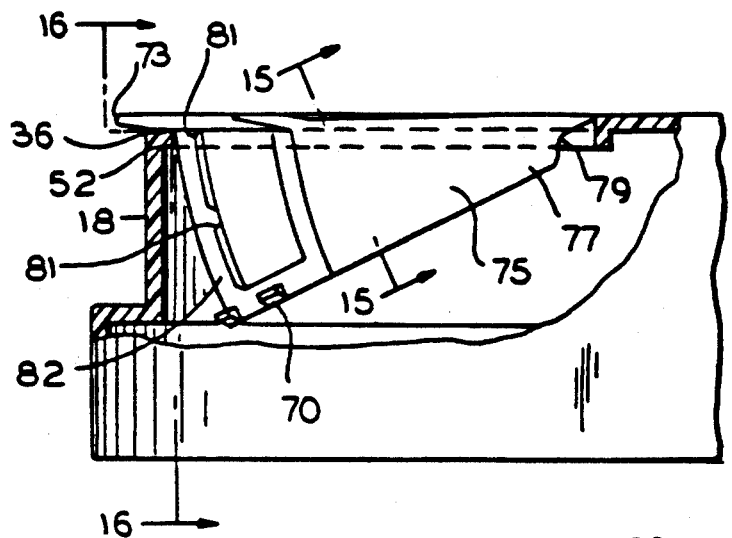
FIG. 14 is a side view with portions broken away to show underlying portions of a container closure cap of FIG. 10.

An undersurface 68 of the hinged portion is provided with a plurality of divider walls ribs 69 which, in the preferred embodiment are parallel to each other but at a slight angle to the converging sidewalls 65, 66. The divider walls are wedge shaped with varying height such that, as illustrated in FIG. 12, each wall 69 has a short end 71 near the hinge connection 62 and a taller forward end 72 adjacent the dispensing periphery of the opening 84. The walls 69 terminate short of a foremost projection 73 of the hinged lid 60 which foremost projection overlies and extends significantly beyond a peripheral top 36 of the periphery 18 to form an opening lip (FIG. 14).

Sidewalls 74 and 75 extend downwardly from the top surface 76 of the hinged lid at the sides 65 and 66. Both the sidewalls 74 and 75 and the dividing walls 69 are wedge-shaped such that they project below the undersurface 68 to a greater extent adjacent the dispensing peripheral opening 67 and decrease in height towards the living hinge portion 62. The sidewalls 74 and 75 have a lesser angle of wedge inclination than the walls 69. The side wall angle of inclination would normally cause the sidewalls to extend rearwardly beyond the hinge. Thus near a rear terminal end 76, 77 of the sidewalls there is a recessed portion 78, 79 which angles rapidly toward the undersurface 68 of the hinged lid 60. When the hinged lid is in a normal full open position, as shown in FIG. 12, the bottom edge of the sidewall is below the undersurface of the wall 19. In this manner, the sidewalls 74, 75 will always remain captured in the opening in the top 19 so that closing of the hinged lid will be easy to accomplish.

Figure 15:
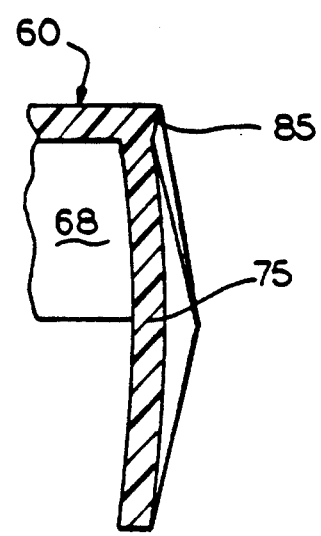
FIG. 15 is an enlarged fragmentary sectional view taken from the front of the container closure of a sidewall of the hinged portion substantially along the lines of 15—15 of FIG. 14.

The sidewalls 74, 75 are preferably formed as sections of a cone, as best seen in FIG. 15, such that the walls 74, 75 are bowed outwardly slightly along a height of the walls to maintain the outer surface of the walls in tight sealing contact with the opening sides 65, 66 in the top wall 19 of the closure as the hinged portion 60 moves between an open and closed position.

Figure 16:
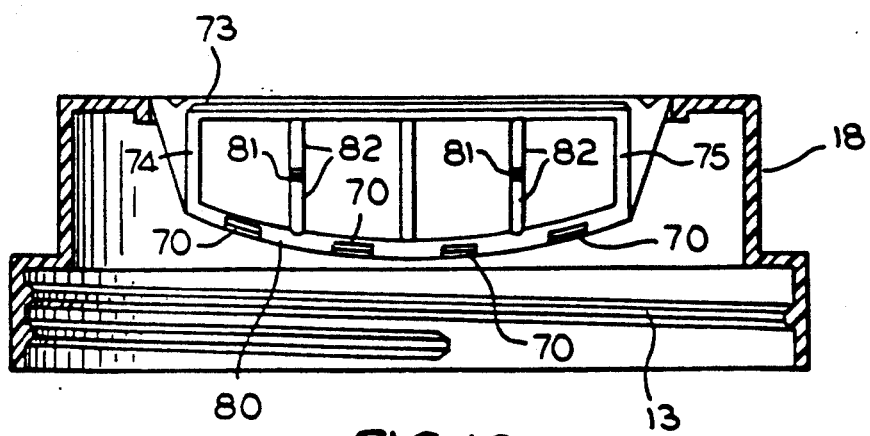
FIG. 16 is a cross-sectional view taken substantially along the lines of 16—16 of FIG. 14.

As best illustrated in FIG. 16 the dividing walls 69 and sidewalls 74 and 75 are all interconnected at the dispensing end of the hinged flap 60 at their bottoms by a web member 80. The web member 80 has a projecting latch portions 70 which are designed to underlie an inturned lip portion 52 at the top 36 of the periphery 18 to form a catch that with the latches 70 limits the opening of the hinged lid.

Additionally, one or more of the dividing walls 69 may be provided with detentes 81 which are formed by elongated integral ribs 82 formed on the arcuate ends of one or more of the dividing walls. The ribs 82 are sized and dimensioned so that the detentes 81 engage the inturned lip 52 as the hinged lid 60 is moved towards a wider or narrower opening. In this manner a plurality of opened positions can be provided allowing the hinged lid to be shaped into greater and lesser opened positions. In the most fully closed position the topmost of the detentes 81 cooperates with the opposed surface of the lip 52 to maintain the dispensing lid or flap 60 closed.

As illustrated in phantom in FIG. 12, the closure cap of this invention may be formed in a single molding most expeditiously by molding the hinged portion elevated out of the opening in the top 19 into which it is to fit. Thereafter by forcing the web latches 70 which may be formed as a series of spaced ribs best shown in FIG. 16, past the inturned lip 52, the pivoted flap 60 can then be inserted into operable position in the remainder of the closure. It will be appreciated that this forcing can occur because the cap will be formed of a rigid but partially yieldable plastics material. Further, the hinged lid 60 may also be reopened to the phantom position of FIG. 12 by forcing the latches 70 past the inturned lip 52, for example, to provide greater access to the interior of the container for a utensil such as a spoon.

It will be seen that by forming the inturned lip 52 of relatively small dimensions extending directly inwardly from the periphery 18 that the actual dispensing opening 83 will lie substantially at the periphery of the hatlike top. Again, by maintaining the ledge 17 relatively small, or even nonexistent, the actual dispensing will occur at the periphery. Moreover it will be appreciated that the hinged lid 60 when in an open position defines a plurality of chute-like passages defined by the undersurface 68, sidewalls 74 and 75, dividing walls 69 and reinforcing web 50. This chute-like dispensing, particularly when coupled with the variable opening settings provided by the detentes 81 allows very effective dispensing of material from the container.

However, when the flap is closed, it is held in a secure closed position by the top detentes 81 to insure against accidental spillage and to act as a protective closure for the contents. By properly sizing the position of the sidewalls 74 and 75, when the lid is closed, little or no gap will exist between the lid 60 and its adjacent walls. If desired, the actual lid can extend slightly beyond the sidewalls 74, 75 (as at 85 in FIG. 15) to facilitate the seal. It will be appreciated that the skirt portion 18 is recessed at the top at the portion overlaid by the lip 73 as illustrated at 36 in FIG. 12.

It will therefore be seen from the above embodiments that this invention provides an improved side dispensing container closure having a hinged lid which is constructed to provide chute-like dispensing passages.

While two embodiments have been shown, modifications and changes may become apparent to those skilled in the art which shall fall within the spirit and scope of the invention. It is intended that such modifications and changes be covered by the attached claims.

We claim as our invention:

1. A one-piece molded plastic container closure having an open bottom and a closed top wall, comprising a peripheral skirt defining the open bottom, said skirt having internal means formed thereon for fixing the closure to a container, said top wall having an aperture therein of a predetermined size, said top wall having a lid with a lid rear hingedly connected to said top and being pivotable to and from a closed position to an open position, said lid having a lid front terminating adjacent a periphery of said top wall, side walls for said lid depending from an undersurface of said lid, at least one dividing wall depending from the lid undersurface and spaced from each of the side walls, said dividing wall having a front face extending from said lid to a reinforcing web and a portion extending towards said lid rear, said reinforcing web interconnecting said side walls at a forward end of said sidewalls remote from said hinge connection, said web being spaced from said lid undersurface, said lid undersurface and said side walls and said web defining at least two dispensing orifices when said lid is pivoted to an open position, said dispensing opening having an outermost edge adjacent the periphery and spaced from the periphery of the top only by a narrow inturned lip whereby the dispensing orifices are substantially at the periphery of the top, said web having latch means thereon projecting forwardly of said sidewalls, said latch means cooperating with said inturned lip extending inwardly of the periphery of said top wall to limit opening of said lid, and said side walls and lid undersurface and dividing wall defining at least two chute-like dispensing passages.

2. A closure according to claim 1 wherein said lid has a plurality of dividing walls depending from the undersurface thereof, said dividing walls terminating in close space relation to said inturned lip and being parallel to one another and extending a predetermined distance from said terminating position towards said hinge.

3. A closure of claim 1 wherein said sidewalls have projections formed thereon and said top adjacent the sidewalls has undersurfaces thereof which cooperate with said projections to retain said lid in selected positions.

4. A closure according to claim 2 wherein said sidewalls have projections formed thereon and said top adjacent the sidewalls has undersurfaces thereof which cooperate with said projections to retain said lid in selected positions, said dividing walls being wedged shaped with said front face being a large end of sand wedge with said front face being in cointact with sand inturned lip, at last one dividing wall front face having a latch means which cooperates with said inturned lip to releasably hold the lid in at least one intermediate open position.

* * * * *